United States Patent [19]

Taylor

[11] Patent Number: 4,976,869
[45] Date of Patent: Dec. 11, 1990

[54] COMPOSITE SEMIPERMEABLE MEMBRANES AND METHOD OF MAKING SAME

[75] Inventor: John A. Taylor, Pinckney, Mich.

[73] Assignee: Separation Dynamics, Inc., Southfield, Mich.

[21] Appl. No.: 354,707

[22] Filed: May 22, 1989

Related U.S. Application Data

[62] Division of Ser. No. 240,632, Sep. 6, 1988, Pat. No. 4,872,982.

[51] Int. Cl.$^5$ .............................................. B01D 61/24
[52] U.S. Cl. .................... 210/644; 210/490; 210/500.23; 210/500.29
[58] Field of Search ................ 427/245; 55/16, 158; 435/176; 210/490, 500.23, 500.29, 644

[56] References Cited

U.S. PATENT DOCUMENTS

| | | | |
|---|---|---|---|
| 4,152,210 | 5/1979 | Robinson et al. | 210/490 |
| 4,329,383 | 5/1982 | Joh | 210/500.24 X |
| 4,527,999 | 7/1985 | Lee | 55/16 |
| 4,533,369 | 8/1985 | Okita | 55/16 X |

*Primary Examiner*—Frank Spear
*Attorney, Agent, or Firm*—Reising, Ethington, Barnard, Perry & Milton

[57] ABSTRACT

A semipermeable hollow fiber membrane (10) consists of a first layer (12) for selectively permeating only water and water soluble substances therethrough and excluding the permeation of hydrocarbon fluids and a second layer (14) covalently bonded to the first layer (12), the second layer (14) being selective permeable only to water soluble substances and excluding water permeation therethrough. The membrane can be used for selectively separating a water soluble substance from water and transferring the water soluble substance to a hydrocarbon fluid.

4 Claims, 2 Drawing Sheets

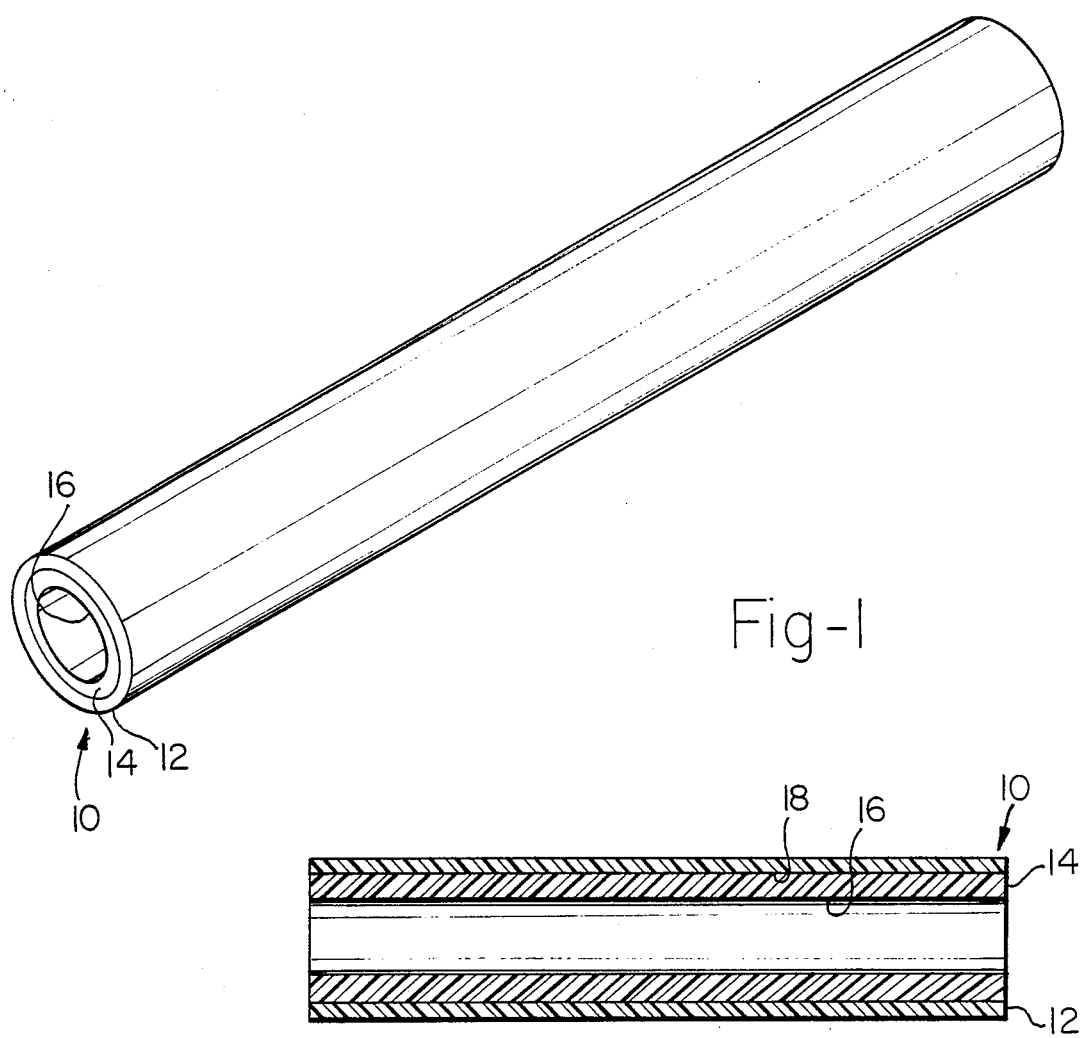
Fig-1
Fig-2
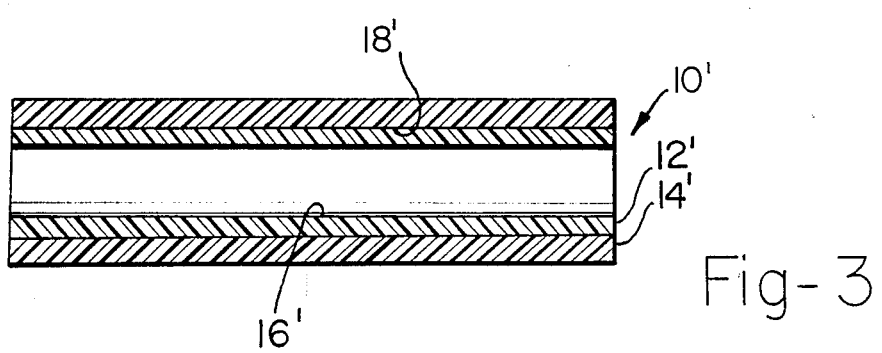
Fig-3

COMPOSITE SEMIPERMEABLE MEMBRANES AND METHOD OF MAKING SAME

This is a division of application Ser. No. 240,632, filed on Sept. 6, 1988, U.S. Pat. No. 4,872,982.

TECHNICAL FIELD

This invention relates to hollow fibers and methods of making the same, as well as to separation processes utilizing such fibers. More particularly, the present invention relates to a composite of a semipermeable hollow fiber membrane and a coating having different permeability characteristics and a method of making the same.

BACKGROUND OF THE INVENTION

The U.S. Pat. No. 4,288,494 issued Sept. 8, 1981 and U.S. Pat. No. 4,333,906, issued June 8, 1982, both issued to Porter et al relate to a semipermeable hollow fiber and method making the same. In accordance with the method, a fiber forming material selected from the group consisting of cuproammonium cellulose solution and viscose cellulose solution are supplied to a chamber and extruded through a space from the chamber to form a hollow core extrudate. A fluid is supplied at a constant mean flow rate to a lumen of a hollow tube, the fiber forming material and fluid exiting such that the fluid forms a hollow core of the formed fiber. The fluid acts as a means for forming the hollow core of the fiber.

The present invention relates to a novel use of the above described technology which utilizes the core fluid as a solvent for chemical reactions or the deposition of coating that alter the inner surface of the hollow fiber. Additionally, the coatings can be deposited upon the outer surface of the fibers.

Methods exist in the prior are for coating various types of fibers. Monsanto Corporation manufactures a cellulose acetate fiber having a silicone coating. The fiber is a porous fiber. The fiber does not provide a complete barrier or nonporous surface capable of creating a complete barrier to the penetration of a fluid therethrough. The cellulose acetate membrane has pores extending therethrough and the silicone coating on the fiber is formed about the pores.

Gas-O-Hol has gained in commercial potential. There exist no highly economical, low energy process for the production of Gas-O-Hol. The present invention further provides a means for transferring ethyl alcohol to another solvent, such as gasoline. Thusly, the present invention provides a highly economical, low energy process for the production of GAS-O-Hol.

SUMMARY OF THE INVENTION

In accordance with the present invention there is provided a method of making a semipermeable hollow fiber membrane, the method including the steps of forming a first semipermeable non-porous layer for selectively permeating only water and water soluble substances therethrough and excluding the permeation of hydrocarbon fluids. A second layer is covalently bonded to the first layer for selectively permeating only water soluble substances through the second layer and excluding the permeation of water.

The present invention also provides a semipermeable hollow fiber membrane consisting of a first layer including water and water soluble substances permeating means for selectively permeating only water and water soluble substances therethrough and excluding the permeation of hydrocarbon fluids. A second layer is covalently bonded to the first layer and includes water soluble substances permeating means for selectively permeating only water soluble substances therethrough and excluding water permeation therethrough.

The present further provides a method of preparing a mixture of a water soluble substance and a hydrocarbon fluid across a membrane having water on one side of the membrane and hydrocarbon fluid on the other side of the membrane, the method including the steps of dissolving a water soluble substance in water and selectively permeating the water soluble substance through a substantiable hydrophobic layer covalently bonded to a semipermeable non-porous layer of a hollow fiber membrane. Water soluble substances are selectively permeated through the non-porous layer of the membrane and removed from the non-porous layer into the hydrocarbon fluid, hydrocarbon fluids being excluded from the non-porous layer.

FIGURES IN THE DRAWINGS

Other advantages of the present invention will be readily appreciated as the same becomes better understood by reference to the following detailed description when considered in connection with the accompanying drawings wherein:

FIG. 1 is a perspective view of a hollow fiber membrane constructed in accordance with the present invention;

FIG. 2 is a cross sectional view of the hollow fiber membrane along the length thereof;

FIG. 3 is a cross sectional view of a second embodiment of the present invention;

DETAILED DESCRIPTION OF THE INVENTION

Figure 4:
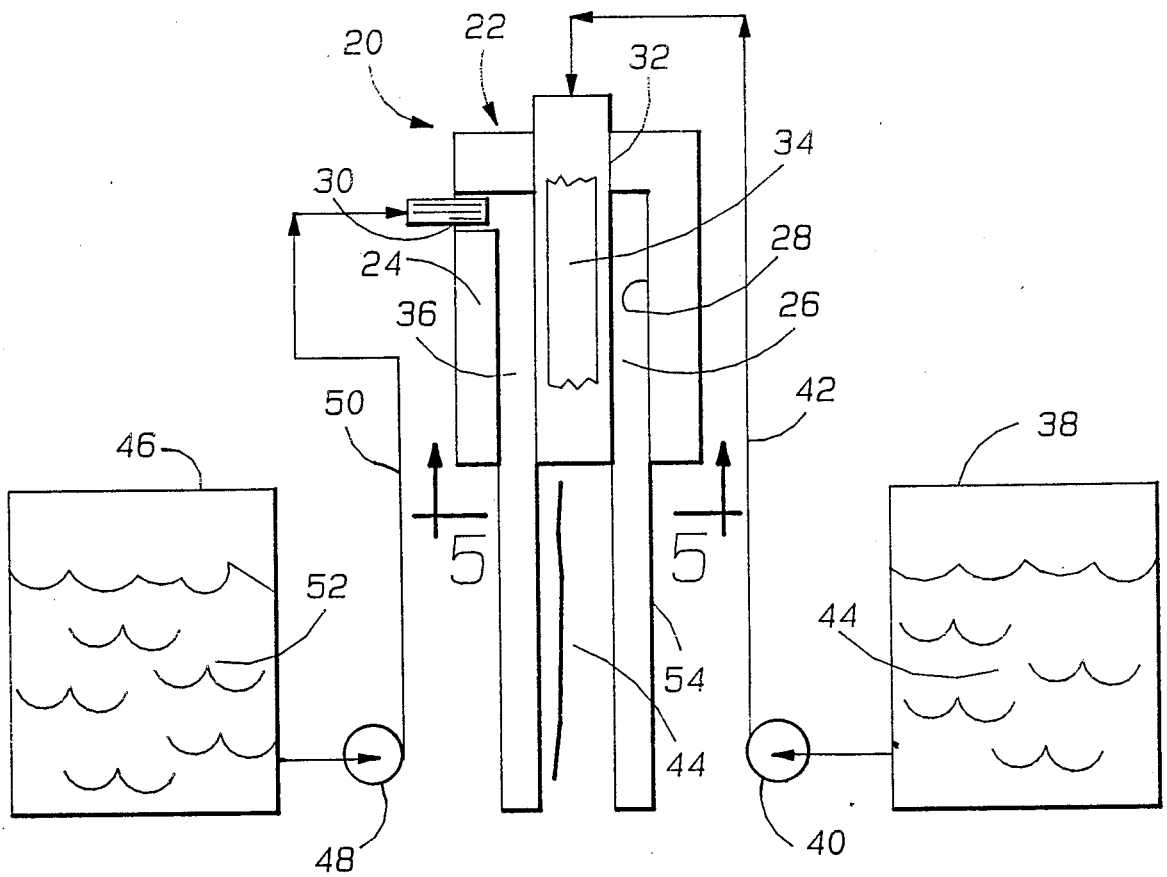
FIG. 4 is a schematic view, with certain parts shown in section, of an apparatus for making the hollow fibers of the present invention.

A semipermeable hollow fiber membrane constructed and made in accordance with the present invention is generally shown at 10 in the Figures.

Generally, the membrane 10 includes a first layer 12 which is selectively permeable only to water and water soluble substances and excludes the permeation of hydrocarbon fluids. A second layer 14 is covalently bonded to the first layer 12 and is selectively permeable only to water soluble substances and excludes water permeation therethrough. That is, the first layer 12 is a non-porous hydrophilic layer and the second layer 14 is a hydrophobic layer which is selectively permeable to water soluble substances. The layers are covalently bonded together to form a composite fiber structure.

As shown in FIGS. 1 and 2, the first layer 12 is an outer layer and the second layer 14 is an inner layer, the second layer 14 forming an inner wall about a hollow core 16 of the fiber 10.

A second embodiment of the invention is shown in FIGS. 3, prime numbers being used to show like structure between the two embodiments. In the second embodiment shown in FIG. 3, the first layer forms an inside layer of the fiber, the second layer 14' being disposed about and covalently bonded to the outer surface of the first layer 12'.

The first layer 12, 12' is a non-porous layer consisting essentially of a membrane made from a precursor from the group consisting of cuproammonium regenerated cellulose, cellulose esters, cellulose ethers, and viscose cellulose. It has been found that these cellulose materials lend themselves readily as a substrate to which the bonding of silanes, silazanes, siloxanes, and other monomeric, oligomeric and polymeric silicon containing materials may be accomplished. The second layer 14, 14' consists of at least one organo-silicon compound.

The first non-porous membrane 12, 12' has a surface 18, 18'. The cellulose materials comprising the first non-porous layer 12, 12' have free reactive hydroxol groups on the surface 18, 18'. The organo-silicon compound comprising the second layer 14, 14' is selected from the group including the silanes, silazanes, siloxanes, and other monomeric, oligomeric and polymeric silicon containing materials including moieties capable of covalently bonding to the surface 18, 18' by reacting with the hydroxyl groups of the surface. Thusly, in the preferred embodiment of the present invention, although there is some hydrogen bonding between the various branches of the organo-silicon compound to the various moieties of the surface 18, 18' of the first layer 12, 12', the organo-silicon compounds are strongly held to the surface 18, 18' by the covalent bond between the organo-silicon compound and the freely reactive hydroxal groups on the surface 18, 18' of the first layer 12, 12'.

Extremely thin, defect free layers of the organo-silicon material are irreversibly attached to the first layer 12, 12'. This can be accomplished during the membrane production process or to the finished cellulose membrane, the method being described below.

The present further provides a method of making the semipermeable hollow fiber membranes 10, 10'. The method utilizes an apparatus substantially described in the U.S. Pat. Nos. 4,288,494 and 4,333,906, both to Porter et al. The inventor of the present invention is a co-inventor in the aforementioned patents. The apparatus is schematically shown in FIGS. 4 & 5.

Figure 5:
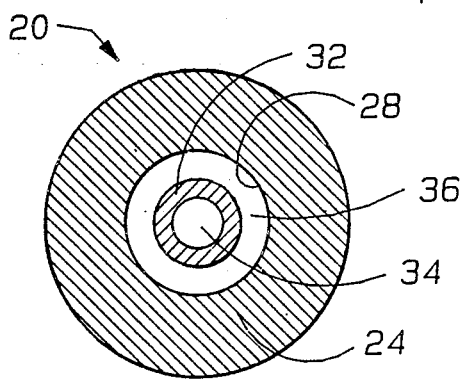
FIG. 5 is a cross sectional view taken substantially along lines 5—5 of FIG. 4.

Referring to FIGS. 4 & 5, the apparatus is generally indicated at 20. The apparatus 20 includes a spinneret generally indicated at 22 comprising a housing 24 having a circular chamber 26 defined by interior wall 28. One end of the chamber 26 communicates with the outer bottom surface of the spinneret 22. The upper end of the chamber 26 communicates with an inlet 30 in the side of the housing 24. A circular tube 32 has a lumen 34 extending the length thereof and is concentrically fixed within the chamber 26 One end of the tube 32 communicates with the outer bottom surface of the spinneret 22. The other end of the tube 32 projects somewhat beyond the top of the spinneret 22. The outer surface of the tube 32 cooperates with the interior wall 28 to define an annular space 36 through which a fiber forming material is extruded. A core fluid, either the liquid or a gas, may be passed through lumen 34 of the tube 32.

The apparatus 20 further includes a first reservoir 38 and a pump 40. The reservoir 38 and pump 40 are connected by conduit 42 to the lumen 34 of the tube 32. The supply of core fluid 44 is held in the reservoir 38. The core fluid 44 passes from the reservoir 38 through the pump 40 into the lumen 34 of the tube 32.

The apparatus 20 further includes a second reservoir 46 and second pump 48. The reservoir 46 and the pump 48 are connected to the inlet 30 for fluid communication through conduit 50. The reservoir 46 holds a fiber forming material 52.

In operation, the fiber forming material 52 is pumped by pump 48 through conduit 50 through the chamber 26 so as to be extruded as an extrudate tubular wall 54. Simultaneously, the core fluid 44 containing the organo-silicon material is pumped by pump 40 through conduit 42 and into the lumen 34. The wall 54 of the fiber forming material 52 surrounds the core fluid 44. The extrudate, after solidifying or after removal of solvent or after coagulation and regeneration has the structure shown in FIGS. 1 & 2. If the core fluid is a gas, then it need not be removed from the interior of the fiber. If the core fluid is a liquid, such liquid can be removed at any time after the desired fiber has been formed. The apparatus 20 can therefore be used to form a first semipermeable non-porous layer 12, 12' for selectively permeating only water and water soluble substances therethrough and excluding the permeation of hydrocarbon fluid. As the fluid 44 contacts the inner surface of the wall 54, the organo-silicon material within the core fluid 44 covalently bonds to form the second layer 14 which selectively permeates only water soluble substances therethrough and excludes the permeation of water.

The core fluid containing the organo-silicon material is selected from a variety of the inert fluids which allows the bonding of the organo-silicon material to the first layer 12 but do not otherwise react with either the cellulose material or the organo-silicon material Kerosene is an example of an inert core fluid.

The apparatus 20 therefore provides a means of extruding the fiber forming material 52 about the fluid 44 containing the selectively water soluble material permeable compound. The fluid 44 forms the hollow core 16 of the fiber 10 and deposit the selected water soluble material permeable compound on the first layer 12. Non-porous membranes, such as made from the cuproammonium regenerated cellulose in the form of a hollow fiber membrane can be made by the coaxial extrusion of the cuproammonium cellulose solution simultaneously with the core fluid. The choice of core fluid employed for the manufacture of the hollow fiber membrane depends upon the properties that are desired in the finished hollow fiber membrane.

The core fluid can act as both a solvent for the chemical reaction or the deposition of the coating that alters the inner surface of the hollow fiber. The addition of a reactive chemical to the core fluid can serve as a means to create a new composite material with special properties as a membrane with some properties of the base cellulose combined with the properties imparted by the reactive chemical. A wide range of membrane properties can be derived by the combination of the desired monomer, oligomer or polymer with the basic cuproammonium cellulose material.

Although silanes are most suitable for graphting to the cellulose carbohydrate hydroxyl sites, other organo-silicon materials such as siloxanes, silazanes, and other monomers and polymers can be used in the core fluid. Typical examples of silanes suitable for the present invention are as follows:

trimethylbromosilane
trimethylsilyl methanesulfonate
Trimethylsilyl trifluoromethanesulfonate
bis(trimethylsilyl)acetamide
bis(trimethylsilyl)trifluoroacetamide
bis(trimethylsilyl)urea
2-trimethylsiloxypent-2-en-4-one
trimethylsilylacetamide
3-trimethylsilyl-2-oxazolidione
isopropyldimethylchlorosilane
triethylchlorosilane
2,3-dimethyl-2-butyldimethylchlorosilane
triisopropylchlorosilane
triisopropylsilyl trifluoromethanesulfonate
t-butyldimethylchlorosilane
t-butyldimethylsilylimidazole
t-butyldimethylsilyl trifluoromethane sulfonate
t-butyldiphenylchlorosilane
di-t-butylmethylsilyltrifluoromethane sulfonate
thexyldimethylchlorosilane
thexyldimethylsilyltrifluoromethane sulfonate
(p-t-butylphenethyl)dimethylchlorosilane
(3,3-dimethylbutyl)dimethylchlorosilane;
(neo-hesyldimethyl-chlorosilane)
(N,N-dimethylamino),(3,3-dimethylbutyl)dimehtylsilane
(2,4,6-tri-t-butylphenoxy)dimethylchlorosilane
dimethyldiacetoxysilane
dimethyldiethoxysilane
hexamethylcyclotrisilazane
di-t-butyldichlorosilane
1,3-dichlorotetraisopropyldisiloxane
1,1,4,4,-tetramethyl-1,4-dichlorodisilethylene
1,1,4,4,-tetramethyl-1,4-bis(N,N-dimethylamino)-disiethylene
2-trimethylsilylethanol
2-(diphenylmethylsilyl)ethanol A typical property can be imparted to the normally hydrophillic nature of the inner surface of a cuproammonium regenerated cellulose hollow fiber is hydrophobicity. The hydrophobic inner wall is achieved by employing the reactive silane in a core fluid that is a solvent for the silane, and allowing the silane to react with the cellulose hydroxyl groups of the cellulose during processing. Alternatively, the core fluid could also be used to wash an outer surface of a already formed hollow core fiber to deposit and covalently bond the organo-silicon material to the outer surface thereby forming the fiber shown in FIG. 3.

Other materials, such as any of the siloxane prepolymers, high polymers, silane coupling agents, heparin silane compounds and the like may be used in solution or suspension in the process of the core fluid. Again, the aforementioned core fluids can be used for application to the finished cellulose hollow fibers as an internal core fluid or as an external wash to impart the organo-silicon material to either the inner surface or outer surface of the membrane, respectively.

The ability of imparting a hydrophobic second layer 14, 14' to the first layer 12, 12' allows the hollow fiber membranes to serve in novel processes for preparing a mixture of a water soluble substance in a hydrocarbon fluid across the membrane 10, 10'.

Cuproammonium regenerated cellulose membranes are well known to be permeable to water and water soluble solutes. For example, if ethyl alcohol is dissolved in water, the dissolved alcohol cannot be efficiently separated from the water with a cuproammonium cellulose membrane alone. This is because the cuproammonium cellulose membrane is substantially equally permeable to the both the water and water soluble substances. Other membranes have been used in conjunction with pre-evaporation technics to accomplish this type and similar separations, but such methods employ a vacuum and often further utilize heat. Therefore these methods are not as efficient as is now possible with the present invention.

The present invention provides a new material that is permeable to water and the water soluble substances on one side and permeable to only the water soluble substances on the other side. Therefore, the present invention provides a means for dissolving ethyl alcohol in water and transferring the ethyl alcohol directly to another solvent such as gasoline.

Figure 7:
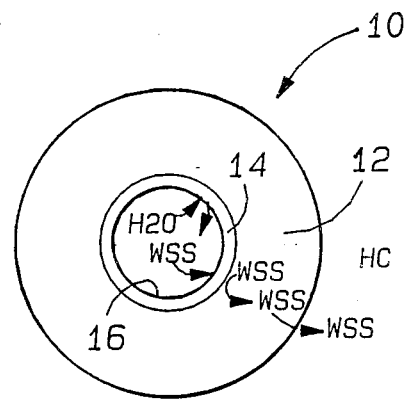
FIG. 7 is a cross sectional view taken substantially along lines 7—7 of FIG. 6 showing the permeation process of the present invention.
Figure 6:
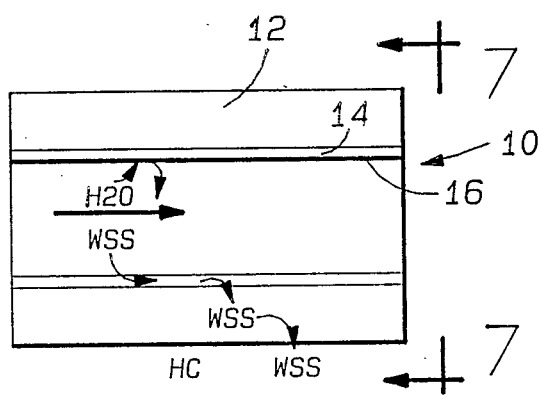
FIG. 6 is a fragmentary cross sectional view of a hollow fiber made in accordance with the present invention schematically showing the permeation process of the present invention.

Generally, the present invention provides a method for preparing a mixture of a water soluble substance, such as the organo-silicon material discussed above, and a hydrocarbon fluid, such as gasoline, across the membrane 10, 10' having water on one side of the membrane 10, 10' and a hydrocarbon fluid on the other side of the membrane 10, 10', as schematically shown in FIGS. 6 & 7.

The water soluble substances dissolved in water and indicated in FIGS. 6 & 7 by $H_2O$ as water and WSS as water soluble substances. The water soluble substance is selectively permeated through the inner substantially hydrophobic layer 14 covalently bonded to the semipermeable non-porous layer 12 of the hollow fiber membrane 10. The water soluble substance is then selectively permeated through the outer layer 12 of the membrane 10. The water soluble substance is removed from the layer 12 and into the hydrocarbon fluid indicated at HC in FIGS. 6 & 7.

It is critical that the layer 12 be made from the cellulose materials listed above as these materials are non-porous and do not swell in the presence of the hydrocarbon. The cuproammonium regenerated cellulose material is especially resistant to degradation in the presence of the hydrocarbon. Thusly, alcohol can be transferred from water to gasoline thereby providing a highly economical, low energy process for the production of GAS-O-Hol. Other similar separations based upon the use of the properties of the novel membranes are also possible, depending upon the organo-silicon material used.

EXAMPLE I

A hollow fiber being a composite of cuproammonium regenerated cellulose and an organo-silicon material was produced by co-extrusion of cuproammonium cellulose solution with a core fluid containing a chemically reactive silane capable of chemically bonding to the hydroxyl groups naturally present in the cellulose.

A cuproammonium regenerated cellulose/silane composite hollow fiber was made using apparatus 20 shown in FIG. 4 & 5. Tube 32 of the spinneret 22 has an outside diameter of 0.040 inch and an inside diameter of 0.015 inch. The outer diameter of annular orifice 36 at the exit of the spinneret 22 is 0.190 inch, i.e., the distance between the outer surface of tube 32 and inner wall 28 is 0.075 inch.

The core fluid, i.e., the material to be supplied to lumen 34 of hollow tube 32 and which will be contained in the hollow core of extrudate 54 exiting the spinneret, was prepared by dissolving 197.4 grams of trimethylchlorosilane (Petrarch Systems, Bristol, Pa.) in 22.75 liters of prefiltered kerosene. The concentration of the silane in the kerosene was approximately 0.07 moles per liter. The kerosene solution of the silane was transferred to the reservoir 36 and maintained under nitrogen.

Pump 40 is a positive displacement metering pump which is capable of supplying the kerosene/silane core liquid at a selected constant mean flow rate to the tube 32 of the spinneret 22.

The fiber forming material was a conventional cuproammonium cellulose solution containing 8.5% by weight cellulose (purified cotton linters), 3.5% by weight copper (as Cu++) and 18.2% by weight ammonium ($NH_4+$). The viscosity of the cuproammonium cellulose may conveniently range from about 25000 to 55000 centipoise at 25 degrees C. and its specific gravity is 1.3 at 25 degrees C. A supply of the cuproammonium cellulose solution was pumped by a positive displacement metering pump 48 to inlet 30 of spinneret 22.

The lines 42 connecting reservoir 38, pump 40, and the lumen 34 of hollow tube 32 were purged with the kerosene/silane core material. The lines 50 connecting reservoir 46, pump 48 and inlet 30 were purged with the cuproammonium cellulose solution.

To produce the desired cuproammonium hollow fiber, the aforementioned cuproammonium cellulose solution 52 was supplied to spinneret 22 at a rate of about 6 grams (4.6 ml) per minute. As can be seen in FIG. 4, the cuproammonium cellulose solution 52 first flowed through inlet 30, then through annular space 36 defined by the outer surface of tube 32 and the walls 28 of chamber 26, after which it leaves the spinneret exit as extrudate 54.

As the cuproammonium cellulose solution 52 was being supplied to inlet 30 of spinneret 22, the kerosene/silane core liquid 44 is supplied to the lumen 34 of hollow tube 32 at a constant mean flow rate of about 3.2 grams/minute. The core liquid 44 enters the hollow tube 32 at the top of the spinneret 22 and leaves at the bottom. As the core liquid 44 leaves the spinneret 22, it is enclosed in the hollow core of the extruded cuproammonium cellulose solution 54.

The extrudate 54 is allowed to fall through an open space of about 11 cm. into a coagulation bath of 15% NaOH (not shown). This distance may be varied in order to control the outer diameter of the final fiber. Sodium hydroxide coagulation baths are well known in the cuproammonium cellulose fiber art; it is also well known that the concentration of sodium hydroxide may be varied if desired. The coagulated extrudate is led from the coagulating bath into a regenerating bath, after which it is rinsed; plasticized or otherwise treated if desired; dried; and collected in a suitable collection device. The regenerating bath is 3% by weight aqueous sulfuric acid. The coagulated and regenerated fiber is rinsed in a water bath, dried at 110 degrees C., and collected. It will be recognized by those skilled in the art that other coagulating and regenerating baths well known in the art may be used in place of the sodium hydroxide coagulating bath and the sulfuric acid regenerating bath employed in Example I.

The finished hollow fibers were mounted in test cells and measurements of water and ethyl alcohol permeability were carried out. In addition, tests of the hollow fibers were conducted by placing samples of the hollow fibers in demineralised water at 100 degrees F for 72 hours. The change in dimensions was then measured of the hollow fibers so exposed to water. Finally, normal cuproammonium hollow fibers produced by the conventional cuproammonium regenerated cellulose process were used as control samples in all testing for comparative purposes.

EXAMPLE II

An alternative method was employed to couple the trimethylchlorosilane to the inner wall of cuproammonium hollow fibers so as produce a composite cellulose/organo-silicon membrane material.

An artificial kidney device normally used for hemodialysis containing one square meter of cuproammonium hollow fibers was used in this example to convert unmodified cuproammonium cellulose membrane material to a composite membrane material comprised of cellulose and an organo-silicon. The artificial kidney was first flushed with isopropyl alcohol so as to remove the glycerol plasticising agent from the membrane. Next the isopropyl alcohol was flushed out of the artificial kidney with clean, filtered kerosene. The inside of the hollow fibers were then exposed to a 0.07 molar solution of trimethylchlorosilane in kerosene The kerosene solution of the trimethychlorosilane was recirculated for one hour through the inside of the hollow fibers using a peristaltic pump connected to the artificial kidney with flexible polyurethane tubing. The artificial kidney was then disconnected from the circuit and rinsed with kerosene to remove the residual kerosene/silane solution.

The artificial kidney containing cellulose/organo-silicon composite hollow fiber membrane was then tested using an untreated artificial kidney as a control. Table II contains the test results.

EXAMPLE III

In this example the organo-silicon material employed to create a composite material with cuproammonium cellulose was a room temperature vulcanizeable (RTV) acetoxy terminated polydimethylsiloxane. The same process as described in example (I) was used to produce the composite cellulose/organo-silicon hollow fiber membranes except that in this example 3% (w/w) of polydimethylsiloxane, acetoxy terminated prepolymer (Petrarch) having a molecular weight of about 36,000. was dissolved in 22.75 liters of kerosene and served as the core fluid for the coextrusion. Tests were conducted on the hollow fibers comprised of the cellulose/silicone composite material for water and ethyl alcohol permeability Table I contains the test results.

EXAMPLE IV

An artifical kidney of the type employed in example II was used to create a hollow fiber membrane of cellulose/organo-silicon composition. In this example, the artificial kidney was first rinsed with isopropyl alcohol followed by removal of the alcohol with kerosene as in example II. Next, a solution of 3% polydimethylsiloxane in kerosene was recirculated through the inside of the hollow fibers for 15 minutes at 70 degrees F. The kerosene containing the siloxane was drained from the artificial kidney and the remaining residual kerosene evaporated from the inside of the hollow fibers using a gentle current of air. The resulting cuproammonium cellulose/organo-silicon composite hollow fiber membrane was tested for alcohol and water permeability. Test results are contained in Table I.

Tables (I) and (II) contain the results of tests conducted with the cellulose/organo-silicon composite hollow fibers membranes prepared in examples I, II, III, and IV.

TABLE I

| Composite Type | Hydraulic Permeability (ml/hr × m × mm Hg) | Alcohol Permeability (ml/hr × m × mm Hg) |
| --- | --- | --- |
| Example I | 0 | 3.9 |
| Untreated Control Membrane | 4.6 | 3.3 |
| Example II | 0.04 | 4.1 |
| Untreated Control Membrane | 4.0 | 4.0 |
| Example III | 0 | 7.9 |
| Untreated Control Membrane | 4.9 | 6.6 |
| Example IV | 0 | 4.1 |
| Untreated Membrane | 5.1 | 3.8 |

TABLE II

Dimensional Change Upon Water Wetting

| Composite Type | Dimensional Change (percent) |
| --- | --- |
| Example I | 0.6 |
| Untreated Control Membrane | 3.3 |
| Example II | 0.33 |
| Untreated Control Membrane | 2.9 |
| Example III | 0.17 |
| Untreated Control Membrane | 3.1 |
| Example IV | 1.04 |
| Untreated Control Membrane | 4.4 |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of preparing a mixture of a water soluble substance and a hydrocarbon fluid across a membrane (10, 10′) having water on one side of the membrane (10, 10′), said method including the steps of:
dissolving a water soluble substance in water; selectively permeating the water soluble substance through a substantially hydrophobic layer (14) covalently bonded to a semipermeable non-porous layer (12) of a hollow fiber membrane (10); selectively permeating the water soluble substance through the non-porous layer (12) of the membrane (10); and removing the water soluble substance from the non-porous layer (12) and into the hydrocarbon fluid.

2. A method as set forth in claim 1 wherein the water soluble substance is an alcohol.

3. A method as set forth in claim 2 wherein the hydrocarbon fluid is a hydrocarbon fuel.

4. A method as set forth in claim 1 wherein said non-porous layer (12) includes water and water soluble substance permeating means for selectively permeating only water and water soluble substances therethrough and excluding the permeation of hydrocarbon fluids, said hydrophobic layer (14) being covalently bonded to said non-porous layer (12) and including water soluble substances permeating means for selectively permeating only water soluble substances therethrough and excluding water permeation therethrough.

* * * * *